(12) United States Patent
Burns et al.

(10) Patent No.: US 9,328,837 B2
(45) Date of Patent: May 3, 2016

(54) DOUBLE SEAT VALVE WITH ISOLATED VENT CHAMBERS

(71) Applicant: SPX Corporation, Charlotte, NC (US)

(72) Inventors: Keith Burns, Genoa City, WI (US); Drew Van Norman, Whitewater, WI (US)

(73) Assignee: SPX FLOW, INC., Charlotte, NC (US)

( * ) Notice: Subject to any disclaimer, the term of this patent is extended or adjusted under 35 U.S.C. 154(b) by 0 days.

(21) Appl. No.: 14/027,862

(22) Filed: Sep. 16, 2013

(65) Prior Publication Data

US 2014/0096838 A1    Apr. 10, 2014

Related U.S. Application Data

(60) Provisional application No. 61/709,776, filed on Oct. 4, 2012.

(51) Int. Cl.
*F16K 25/00* (2006.01)
*F16K 1/44* (2006.01)

(52) U.S. Cl.
CPC ................. *F16K 25/00* (2013.01); *F16K 1/446* (2013.01); *Y10T 137/043* (2015.04); *Y10T 137/4245* (2015.04)

(58) Field of Classification Search
CPC ........... F16K 25/00; F16K 1/44; F16K 1/443; F16K 1/446; F16K 25/02
USPC ............. 137/15.06, 238, 240, 614.17, 614.18
See application file for complete search history.

(56) References Cited

U.S. PATENT DOCUMENTS

| | | | |
|---|---|---|---|
| 5,048,555 A * | 9/1991 | Mieth et al. ................... | 137/238 |
| 5,699,825 A * | 12/1997 | Norton .......................... | 137/238 |
| 5,771,926 A * | 6/1998 | Medal et al. ............. | 137/614.18 |
| 6,178,986 B1 * | 1/2001 | Burmester .................... | 137/240 |
| 7,891,376 B2 | 2/2011 | Neuhauser et al. | |
| 8,327,881 B2 | 12/2012 | Norton | |
| 8,528,584 B2 * | 9/2013 | Wiedenmann et al. .. | 137/614.18 |

* cited by examiner

*Primary Examiner* — Kevin Lee
(74) *Attorney, Agent, or Firm* — Baker & Hostetler LLP

(57) ABSTRACT

A valve comprising sealing members configured to allow the valve to achieve an open position, a closed position, lower seat clean position and an upper seat clean position is described. A method including opening a valve, closing a valve, moving the valve to a lower seat clean position, and moving the valve to an upper seat clean position is described.

23 Claims, 5 Drawing Sheets

DOUBLE SEAT VALVE WITH ISOLATED VENT CHAMBERS

CLAIM FOR PRIORITY

The present application is a Non-Provisional Application that claims priority to U.S. Provisional Patent Application No. 61/709,776, filed Oct. 4, 2012, entitled Double Seat Valve with Isolated Vent Chambers, the disclosure of which is hereby incorporated by reference in its entirety.

FIELD OF THE INVENTION

The invention relates to the field of valves and more particularly to double seat valves with cleanable seats.

BACKGROUND OF THE INVENTION

Double seat block and bleed valves are in wide use in industry, for example in the food, dairy, beverage, pharmaceutical and biotechnology businesses. One example of such a double seat valve is a valve that is operated in connection with two flow conduit paths. In some applications, such as, for example, the industries mentioned above, it is desirable sometimes to interrupt the flow of the material and instead flush the system using a clean-in-place solution. One way this is sometimes accomplished is that the process material continues to flow through one conduit, while the clean-in-place solution flows through the other conduit.

In such systems, it is desirable that the process material be very well sealed and segregated from the clean-in-place solution so that the process material and the clean-in-place solution do not contact one another. In one example of such type of system, each conduit has a respective seat, and each conduit has a respective closing member or stem (usually as a reciprocating flanged valve stem), and the closing members can each be axially moved between a position sealing the seat and a position opening the seat. In the cleaning position, a valve associated with a respective conduit is opened when cleaning solution is in the conduit, and the cleaning solution is thus permitted to move from the conduit and exit through a drain. This cleaning process can occur while the other valve is closed, and process material is flowing through the other conduit.

SUMMARY OF THE INVENTION

Some embodiments of the invention relate to the field of valves and more particularly to double seat valves with cleanable seats.

In one embodiment of the present invention, a valve assembly is provided comprising: a valve body having an interior space; a conduit in fluid communication with said interior space; an upper stem assembly; a lower stem assembly; a vent space disposed between said upper stem assembly and said lower stem assembly; a resilient sealing surface disposed within said vent space; at least one blocker stop that extends from said upper stem assembly; a first side channel that extends through said lower upper stem assembly that is in fluid communication with said interior space; and a center channel that extends through said lower upper stem assembly that is in fluid communication with said vent space.

Another embodiment of the present invention, a valve assembly is provided, comprising: a valve body having an interior space; a conduit in fluid communication with said interior space; an upper stem assembly; a lower stem assembly; a vent space disposed between said upper stem assembly and said lower stem assembly; a resilient sealing surface disposed within said vent space; at least one blocker stop that extends from said upper stem assembly; a first side channel that extends through said lower upper stem assembly that is in fluid communication with said interior space; a center channel that extends through said lower upper stem assembly that is in fluid communication with said vent space; an actuator assembly connected to said valve assembly, said actuator assembly comprising: a rod connected to the lower valve assembly and connected to the upper valve assembly, wherein said rod translates said lower valve assembly and said upper valve assembly to an open position and a closed position; a thread piston threadably engaged to said rod; a spring that biases said piston; an actuating sleeve through which said rod extends; and a base that mounts to said valve assembly.

In yet another embodiment of the present invention, a method for cleaning a valve assembly having a valve body is provided, comprising the steps of: translating an upper stem assembly in a first direction to a first position against a sealing surface of the valve body away from a vent space; translating a lower stem assembly in an opposite, second direction to a second, opposite position; extending at least one stop from the upper stem assembly to provide a positive stop for the upper stem assembly against the vent space; and flowing a first cleaning fluid through a side channel that extends through the lower and upper stem assembly and into an interior space of the valve body.

In another embodiment of the present invention, a valve assembly is provided comprising: means for translating an upper stem assembly in a first direction to a first position against a sealing surface of the valve body away from a vent space; means for translating a lower stem assembly in an opposite, second direction to a second, opposite position; means for extending at least one stop from the upper stem assembly to provide a positive stop for the upper stem assembly against the vent space; and means for flowing a first cleaning fluid through a side channel that extends through the lower and upper stem assembly and into an interior space of the valve body.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
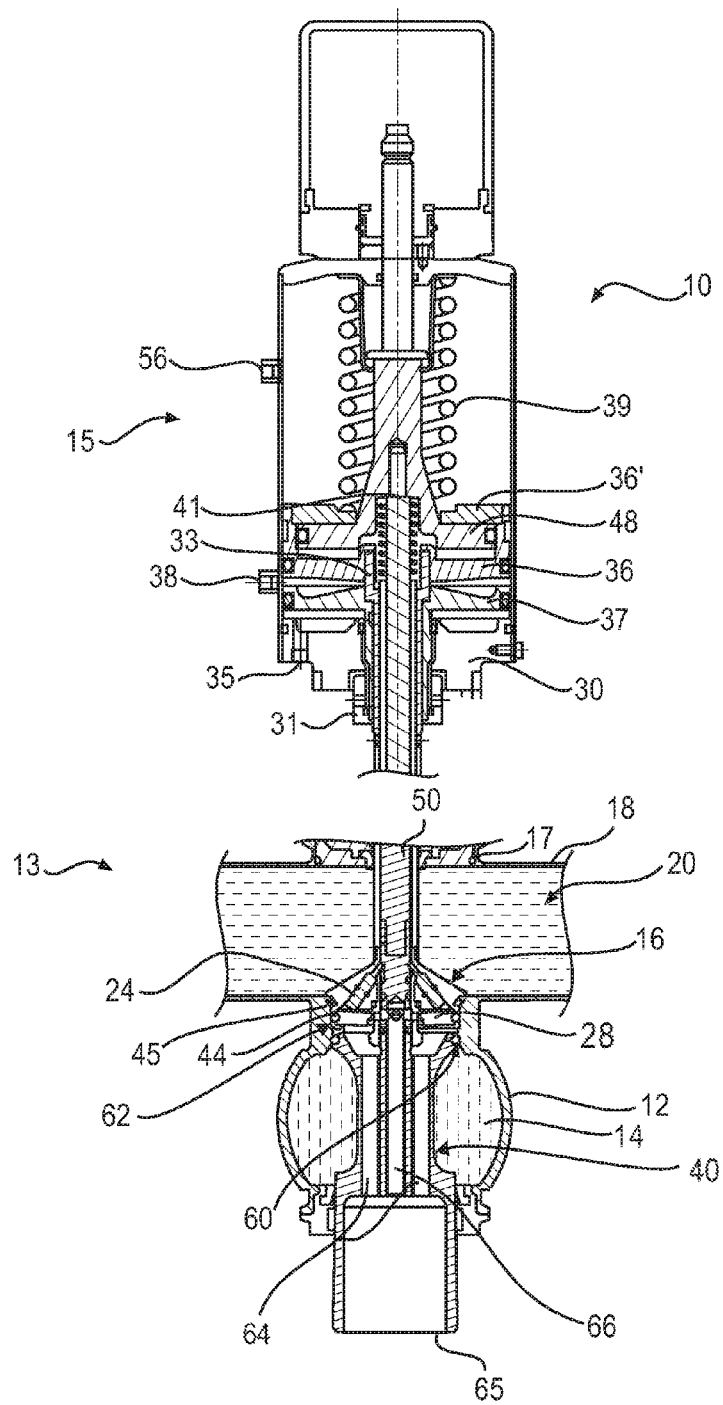
FIG. 1 is a diagrammatic view of a valve according to an embodiment of the invention, showing the valve in the completely closed position

The invention relates to the field of valves and more particularly to seat valves with cleanable seats. Various embodiments of the present invention provide for an advantageous seat valve which prevents or substantially prevents mixing of materials in two different conduits, even when one of the conduits is being used for the clean-in-place (CIP) operation and has a central opening to permit drainage of clean-in-place fluid. Some preferred embodiments will now be described with reference to the drawing figures, in which like reference numbers refer to like parts throughout.

Figure 2:
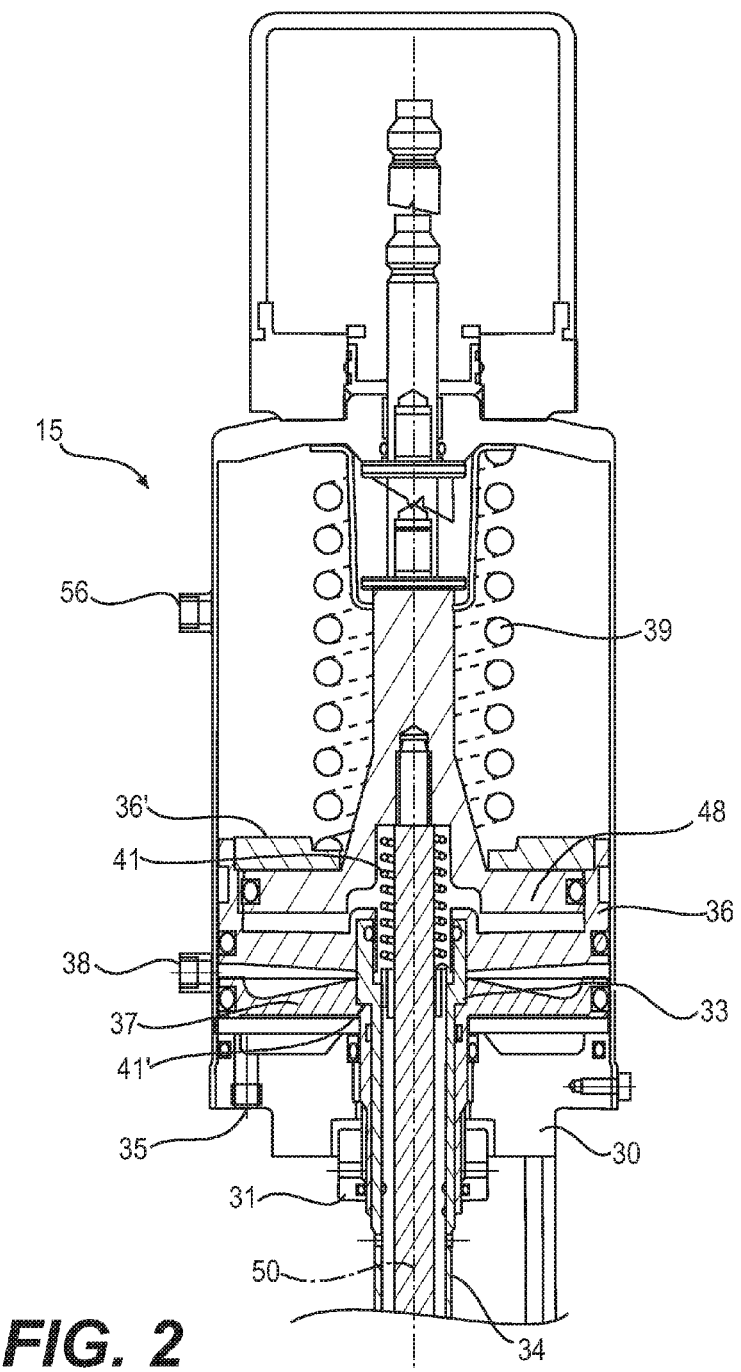
FIG. 2 is a cross-sectional partial view of a portion of the valve of FIG. 1.
Figure 3:
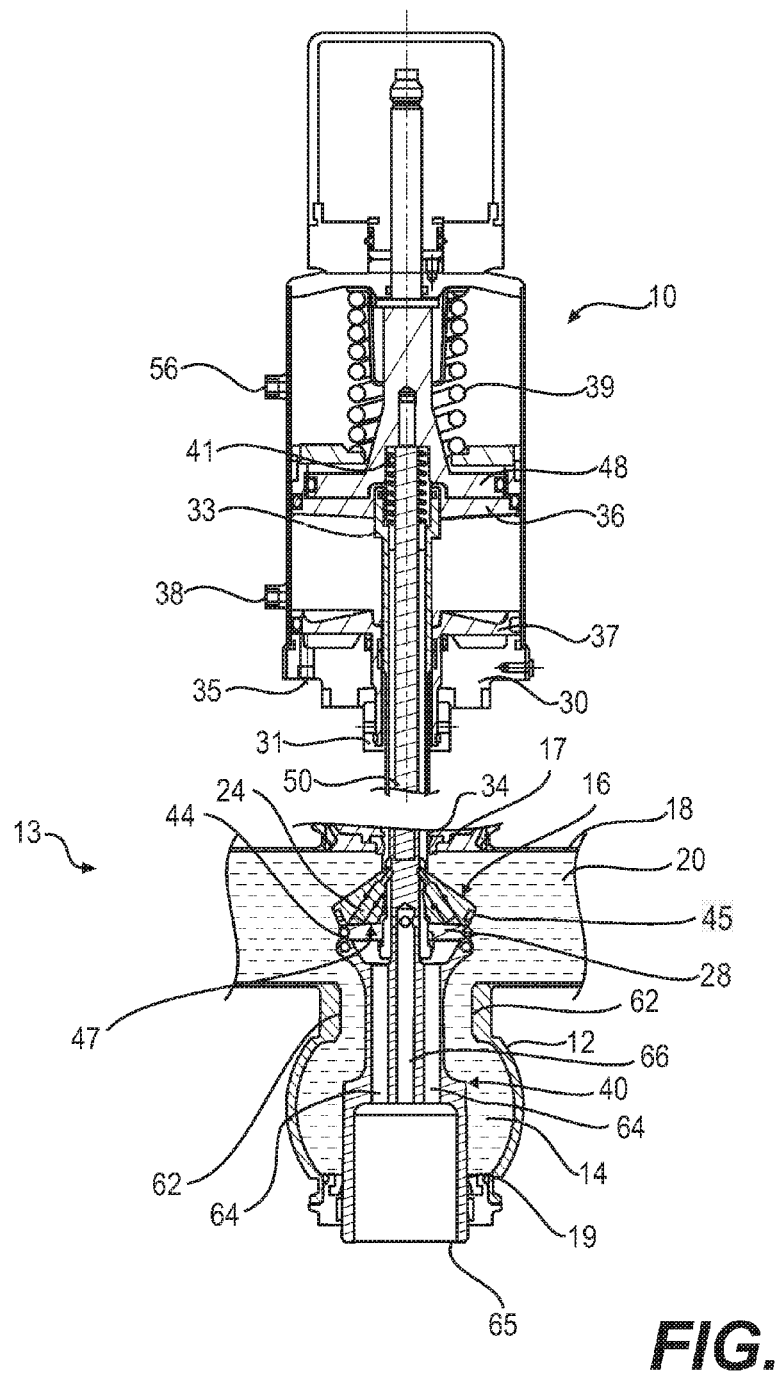
FIG. 3 is a diagrammatic view of a valve, showing the valve in an open position.

Referring now to FIGS. 1-3, it will be appreciated that FIG. 1 is an overall schematic cross-sectional view of a mix proof valve 10, with FIG. 2 being a partial view at a larger scale of an upper portion 15 of the valve 10 of FIG. 1. FIG. 1 illustrates the valve 10 in a closed position where FIG. 3 illustrates the valve 10 in an open position.

The illustrated valve 10, according to the preferred embodiment, includes a valve body 12. The valve body 12 defines a chamber or interior portion 14. The valve 10 is configured to selectively permit fluid access between an interior 20 of a conduit 18 and the interior 14 of the valve body 12. As shown in FIG. 1, an upper valve stem assembly 16 is in a closed position thereby denying fluid access between the interior 20 of the conduit 18 and the interior 14 of the valve body 12.

In some embodiments, the conduit 18 may be used for flowing foodstuffs. At certain times it may be desired to divert some of the foodstuffs contained within the interior 20 of the conduit 18 into the valve body 12. During such time, the valve 10 will achieve an open position as shown in FIG. 3. The small horizontal lines represent the foodstuffs that may be present in the interior 20 of the conduit 18 only as shown FIG. 1 and in both the interior 20 of the conduit 18 and in the interior 14 of the valve body 12 as shown in FIG. 3.

Figure 6:
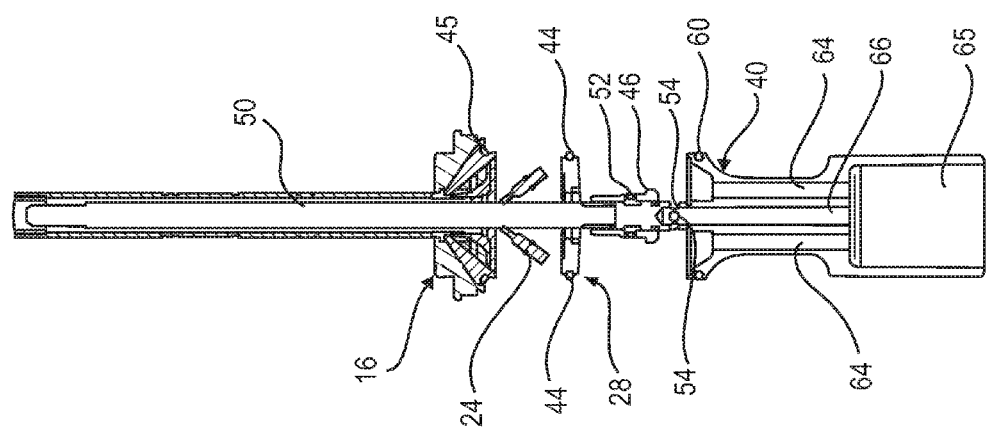
FIG. 6 is a partial cross-sectional view of some of the internal components of the valve.

A lower portion 13 of the valve 10 will now be described. A rod 50 operates the upper valve stem assembly 16. Axial movement of the rod 50 causes axial movement of the upper valve stem assembly 16. The upper valve stem assembly 16 includes blocker stops 24 and a resilient sealing surface 45, as illustrated in FIG. 6. A vent separator 28 is located below the upper valve stem assembly 16. The vent separator 28 includes a resilient sealing feature 44 which, in some embodiments, may be an O-ring (hereafter referred to as "O-ring 44"). A lower valve stem assembly 40 may also have a resilient sealing surface 60 which, in some embodiments, may also be an O-ring (hereafter referred to as "O-ring 60"). The three resilient sealing surfaces 44, 45 and 60 all may seal against the sealing surface 62 of the valve body 12.

The lower valve stem assembly 40 has side channels 64 and an interior channel 66. The side channels 64 and the interior channel 66 may be used when the valve 10 is undergoing a cleaning procedure. The lower valve stem assembly 40 may also include a cleaning space 65 which may be fluidly connected to the side channels 64 and the interior channel 66.

The valve 10 is in a closed position shown in FIG. 1. The lower stem assembly 40 is positioned in the valve body 12 by force generated by a supplemental spring 41.

FIG. 2 illustrates an upper part 15 of the valve 10, including components that actuate or move the upper and lower valve stem assemblies (16, 40). A lower end of FIG. 2 shows the rod 50, which is the same rod 50 shown in the lower portion 13 of the valve 10 in FIG. 1. The rod 50 is ultimately connected to be able to move the lower valve stem assembly (40). Movement of the rod 50 corresponds to the same movement by the lower valve stem assembly (40).

A housing base 30 is provided. The housing base 30 provides a mounting point for some components that are described below. The rod 50 is threadably engaged with a thread piston 48 (also referred to as a lower seat clean piston 48). A main spring 39 biases the lower seat clean piston 48 downwards. An actuating sleeve 34 has an expanded diameter region or collar 33 that rests in an abutting relationship with a center piston 36. Thus, any upward movement of the actuating sleeve 34 is restrained by the position of the center piston 36. Further, the center piston 36 has an upper disc portion 36'.

The main spring 39 abuts against the disc 36', and therefore the travel of the lower seat clean piston 48 is limited by the position of the disc 36'. The collar 33 of the sleeve 34 also has a lower shoulder which abuts with a face of an upper seat clean piston 37. Thus, downward movement of the sleeve 34 is limited by the position of the upper seat clean piston 37. Supply ports 35, 38 and 56 are provided and their operation will now be discussed below with reference to FIG. 3.

The actuation of various components within the valve 10 will now be described with respect to a valve closed position, a upper seat lift position (or upper seat clean position), a lower seat lift position (or lower seat clean position), and a valve open position. These positions are particularly illustrated in FIGS. 1 and 3-5.

FIG. 1 shows the valve assembly 10 in a closed position. In this position, it is not necessary to supply any pneumatic pressure to any of the ports 35, 38 or 56. In this position, the spring 39 provides a downward biasing force on the disc 36'. A supplemental spring 41 is trapped between the lower seat clean piston 48 and the top of sleeve 34 which slides over the rod 50. A non-galling material 41' is provided. Therefore, the supplemental spring 41 provides a biased spring pressure tending to push apart the lower seat clean piston 48 from the collar 33, the sleeve 34, and the upper seat clean piston 37.

In FIG. 1 the upper disc 36' is biased downwards, and by virtue of its shoulder connection with the center piston 36, the center piston 36 is biased downwards with the collar 33 until the collar 33 pushes the upper seat clean piston 37 downward. The upper seat clean piston 37 is still spaced above the housing base 30 because the upper valve stem assembly 16 is fully seated in a closed position so that no further downward travel is permitted. Further, because of the expansion force provided by the intermediate spring 41, the center piston 36 is spaced downwardly from the lower seat clean piston 48. Accordingly, it will be appreciated that in this closed position shown in FIG. 1, the force of the spring 39 is being applied to the disc 36' and thus to the center piston 36 and to the collar 33 and through the sleeve 34 to urge the upper valve stem assembly 16 downward into a fully seated position. On the other hand, the force of the supplemental spring 41 is urging the lower seat clean piston 48 upwards flush against the disc 36', thereby locating the rod 50 so that the lower valve stem assembly 40 is in a seated closed position also.

FIG. 3 illustrates an open valve position. In this position, pressure is applied to port 38, thereby urging the upper seat clean piston 37 into a fully downward position. However, this fully downward position of the upper seat clean piston 37 does not affect the operation of the device, because the remaining components travel upwards, as described below. The application of the pressure to port 38 urges the center piston 36 upwards. The center piston 36 pushes upwards on the lower seat clean piston 48 and compresses the spring 39 to retract the rod 50. Retracting the rod 50 upwards necessarily moves the lower valve stem assembly 40 upwards. Thus, the lower valve stem assembly 40 pushes upwards onto the vent separator 28, and the vent separator 28 is pushed upwards causing the O-ring 44 to be squeezed between the upper valve stem assembly 16 and the lower valve stem assembly 40. Squeezing the O-ring 44 between the upper valve stem assembly 16 and the lower valve stem assembly 40 causes a vent space 47 to be closed. Therefore, there is no fluid communication between the upper valve stem assembly 16, the lower valve stem assembly 40, and the vent separator 28. The O-ring 44 a provides a seal between the upper valve stem assembly 16 and the vent separator 28. Therefore, none of the material inside conduit 18 is able to pass into any gap between these three components 16, 28, and 40, and this material does not drain into the hollow cleaning space 65 of the lower stem 40.

It will be appreciated that an upper seal 17 is provided to seal between the conduit 18 and the sleeve 34, and a lower seal 19 is provided to seal between the lower valve stem assembly 40 and the valve body 12.

Figure 4:
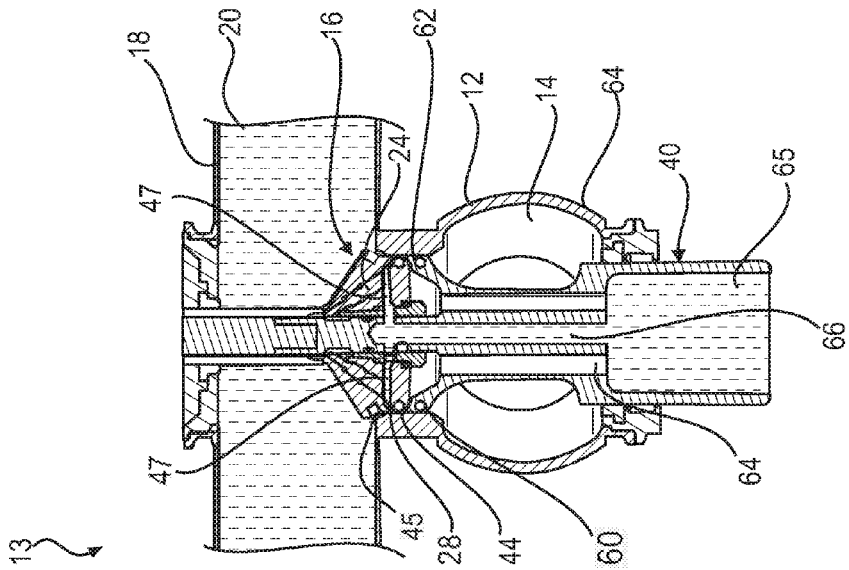
FIG. 4 is a cross-sectional partial view of a lower portion of the valve in a lower seat cleaning position.

FIG. 4 illustrates the lower portion 13 in a lower seat clean position. As shown in FIG. 4, the upper valve stem assembly 16 is in a closed position against the sealing surface 62 of the valve body 12. As the lower valve stem assembly 40 is pushed down for cleaning, the blocker stops 24 are pushed in a downward direction. The blocker stops 24 come partially out of the upper stem assembly 16. The blocker stops 24 provide a positive stop to prevent the vent separator 28 from sealing against the upper valve stem assembly 16 during a lower seat clean operation. The O-ring 44 located on the vent separator 28 is also in a sealing position with respect to the sealing surface 62.

The cleaning solution represented by the vertical dashes located within the interior 14 of the valve body 12 is separated from whatever liquid is in the interior 20 of the conduit 18. The cleaning solution (represented by the vertical dashes) is also present in the side channels 64 and cleaning space 65 of the lower valve stem assembly 40. The vent space 47 located between the vent separator 28 and the upper valve stem assembly 16 is completely sealed by the O-ring 44 from the cleaning solution or whatever fluid is located in the interior 14 of the valve body 12 and the side channel 64. As result, no cleaning fluid or whatever fluid is located in the interior 14 of the valve body 12 can get into the vent space 47.

While that there may be some incidental cleaning solution located in the interior channel 66, by and large the cleaning solution will not enter the channel 66 because air or any other fluid that may be present within the channel 66 cannot be vented into the vent space 47 between the vent separator 28 and the upper valve stem assembly 16 due to the sealing action of the O-ring 44. The vent space 47 between the upper valve stem assembly 16 and the vent separator 28 is completely sealed from liquid that may be in the interior channel 66 during a clean and place procedure due to action of a separator bolt 46 which will be described in more detail below with reference to FIG. 6. As result, the vent space 47 is sealed from cleaning solution that may be present in the interior 14 of the valve body 12 by virtue of the O-ring 44 and the separator bolt 46.

As can be seen in FIG. 4, the lower valve stem assembly 40 has moved to a lower position moving the O-ring 60 mounted on the lower valve stem assembly 40 lower on the sealing surface 62 permitting the lower part of the sealing surface 62 to be exposed to cleaning solution contained within the interior 14 of the valve body 12. As a result, the lower portion of the valve seat (aka sealing surface 62) is cleaned.

Figure 5:
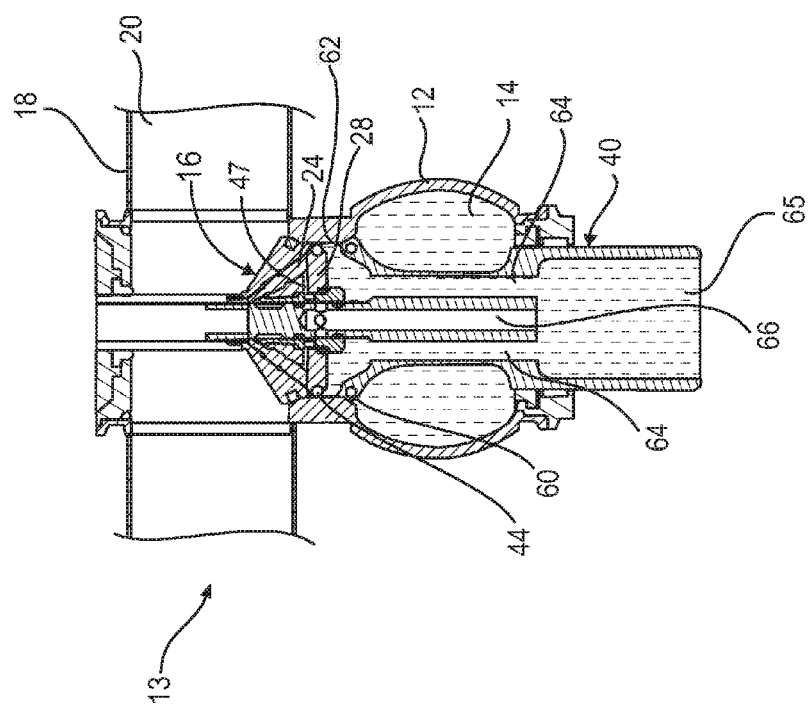
FIG. 5 is a cross-sectional partial view of a lower portion of the valve in an upper seat cleaning position.

FIG. 5 illustrates the lower portion 13 in an upper seat clean position. The upper valve stem assembly 16 has moved to an upper position and is disengaged from the sealing surface 62. The blocker stops 24 have retreated back into the upper valve stem assembly 16. The vent separator 28 is attached to the upper valve stem assembly 16 with a separator bolt 46 that allows the vent separator 28 to move for cleaning when the upper valve stem assembly 16 (See FIGS. 1-3) is stroked for the upper clean procedure. The lower valve stem assembly 40 has the O-ring 60 engaged with the sealing surface 62. The O-ring 44 on the vent separator 28 is also engaged with the sealing surface 62. Due to the O-rings 60 and 44, the interior 14 of the valve body 12 is fluidly isolated from the conduit 18 interior 20.

Because the upper valve stem assembly 16 is spaced from the vent separator 28, the vent space 47 has become enlarged. Furthermore the vent space 47 is now in fluid communication with the interior channel 66 of the lower valve stem assembly 40. The vent space 47 is also in fluid communication with the conduit in 18 interior 20 of the conduit 18. As shown in FIG. 5, cleaning solution (represented by the vertical lines) is present in the interior 20 of the conduit 18, the vent space 47, the interior channel 66, and the cleaning space 65. Because the cleaning solution is in contact with an upper portion of the ceiling surface 62 this position is referred to as the upper seat clean position. Any fluids that may be inside channel 64 are isolated from the interior 14 of valve body 12 by the O-ring 60 located on the lower valve stem assembly 40.

Figure 7:
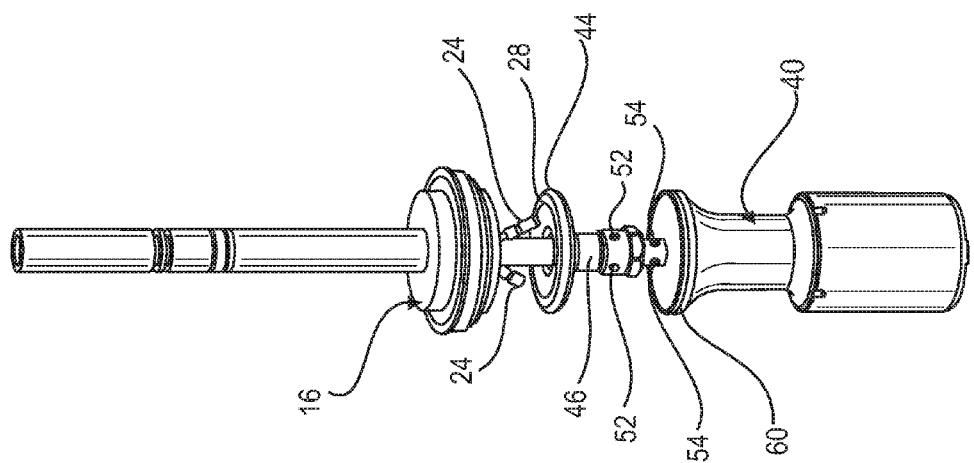
FIG. 7 is a partial isometric view of some of the internal components of the valve.

FIG. 6 is a partial cross-sectional view of interior components of the valve 10. FIG. 6 illustrates an upper valve stem assembly 16 and the blocker stops 24. C The blocker stops 24 have been removed from the upper valve stem assembly for the sake of clarity. Normally the blocker stops 24 are located within cavities in the upper valve stem assembly 16. The upper valve stem assembly 16 also includes a resilient sealing surface 45 which, in some embodiments, may be in O-ring. The vent separator 28 is also illustrated. The vent separator 28 is equipped with a resilient sealing surface which, in some embodiments, is an O-ring as discussed above. The vent separator 28 is attached to the rod 50. A separator bolt 46 contains holes 52. The holes 52 extend through the separator bolt 46. The lower valve stem assembly 40 also contains holes 54. When the valve stem assembly 40 is moved to an upper position, the holes 54 may align with the holes 52 in the separator bolt 46 thereby permitting fluid access between outside of the separator bolt 46 through the holes 52 and 54 into the interior channel 66 of the lower valve stem assembly 40. While the view shown in FIGS. 6 and 7 show the holes 54 of the lower valve stem assembly 40 and the holes 52 of the separator bolt 46 to be out of alignment, FIG. 5 shows the holes 52 and 54 in alignment which provides a fluid access between the interior channel 66 and the vent space 47. In FIG.

6 also shows the side channel 64 and the resilient sealing surface 60 both located out in on the lower valve stem assembly 40.

FIG. 7 illustrates an isometric view of the features shown in cross-section in FIG. 6. The upper valve stem assembly 16 is shown with the blocker stops 24 extended out of the upper valve stem assembly 16. As stated above, the blocker stops 24 are normally located within the upper valve stem assembly 16. However, the blocker stops 24 are shown in FIGS. 6 and 7 out of the upper valve stem assembly 16 in order to better illustrate the blocker stops 24. In FIG. 7, the vent separator 28 is shown as well as the O-ring 44 encompassing about the vent separator 28, and the separator bolt 46 is illustrated along with the holes 52 within the separator bolt 46. In addition, the lower valve stem assembly 40 is illustrated along with the O-ring 60 located on the lower valve stem assembly 40, and the holes 54 in the lower valve stem assembly 40 are also shown. As discussed above, the holes 54 in the lower valve stem assembly 40 provide fluid access to the interior channel 66 with in the lower valve stem assembly 40 as best shown in FIG. 6.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A valve assembly comprising:
    a valve body having an interior space;
    a conduit configured to be in fluid communication with said interior space;
    an upper valve stem assembly;
    a lower valve stem assembly;
    a vent separator and upper valve assembly configured to define a vent space to be disposed between said upper valve stem assembly and said lower valve stem assembly;
    a resilient sealing surface configured to seal said vent space;
    at least one blocker stop configured to extend from said upper valve stem assembly;
    a first side channel that extends through said lower valve stem assembly and is configured to be in fluid communication with said interior space; and
    a center channel that extends through said lower valve stem assembly and said upper valve stem assembly and is configured to be in fluid communication with said vent space.

2. The valve assembly according to claim 1, further comprising a second side channel that extends through said lower valve stem assembly and is configured to be in fluid communication with said interior space.

3. The valve assembly according to claim 2, wherein said center channel extends between said first side channel and said second side channel.

4. The valve assembly accordingly to claim 1, wherein said at least one blocker stop is configured to extend from said upper valve stem assembly to operatively engage said resilient sealing surface.

5. The valve assembly according to claim 1, wherein said at least one blocker stop is a plurality of blocker stops.

6. The valve assembly according to claim 1, wherein said resilient sealing surface is circular in geometry and configured to define at least one radial vent.

7. The valve assembly according to claim 1, wherein said resilient sealing surface is an O-ring.

8. The valve assembly according to claim 6, wherein said center channel is configured to be in fluid communication with said at least one radial vent.

9. The valve assembly according to claim 8, wherein said center channel is configured to be in fluid communication with said conduit via said at least one radial vent.

10. The valve assembly according to claim 3, wherein said center channel is not in fluid communication with said first side channel and said second side channel.

11. The valve assembly according to claim 1, further comprising an actuator assembly connected to said valve assembly, said actuator assembly comprising:
    a rod connected to the lower valve stem assembly and connected to the upper valve stem assembly, wherein said rod translates said lower valve stem assembly and said upper valve stem assembly to an open position and a closed position;
    a thread piston threadably engaged to said rod;
    a spring that biases said piston;
    an actuating sleeve through which said rod extends; and
    a base that mounts to said valve assembly.

12. A valve assembly comprising:
    a valve body having an interior space;
    a conduit configured to be in fluid communication with said interior space;
    an upper valve stem assembly;
    a lower valve stem assembly;
    a vent separator configured to define a vent space to be disposed between said upper valve stem assembly and said lower valve stem assembly;
    a resilient sealing surface configured to seal said vent space;
    at least one blocker stop configured to extend from said upper valve stem assembly;
    a first side channel that extends through said lower and upper valve stem assembly and is configured to be in fluid communication with said interior space;
    a center channel that extends through said lower valve stem assembly and said upper valve stem assembly and is configured to be in fluid communication with said vent space;
    an actuator assembly connected to said valve assembly, said actuator assembly comprising:
        a rod connected to the lower valve stem assembly and connected to the upper valve stem assembly, wherein said rod translates said lower valve stem assembly and said upper valve stem assembly to an open position and a closed position;
        a thread piston threadably engaged to said rod;
        a spring that biases said piston;
        an actuating sleeve through which said rod extends; and
        a base that mounts to said valve assembly.

13. The valve assembly according to claim 12, further comprising a second side channel that extends through said lower valve stem assembly and is configured to be in fluid communication with said interior space.

14. The valve assembly according to claim 13, wherein said center channel extends between said first side channel and said second side channel.

15. The valve assembly accordingly to claim 12, wherein said at least one blocker stop is configured to extend from said upper valve stem assembly to operatively engage said resilient sealing surface.

16. The valve assembly according to claim 12, wherein said at least one blocker stop is a plurality of blocker stops.

17. The valve assembly according to claim 12, wherein said resilient sealing surface is circular in geometry and defines at least one radial vent.

18. The valve assembly according to claim 12, wherein said resilient sealing surface is an O-ring.

19. The valve assembly according to claim 18, wherein said center channel is configured to be in fluid communication with said at least one radial vent.

20. The valve assembly according to claim 19, wherein said center channel is configured to be in fluid communication with said conduit via said at least one radial vent.

21. A method for cleaning a valve assembly having a valve body, the method comprising:
   translating an upper valve stem assembly in a first direction to a first position against a sealing surface of the valve body away from a vent space;
   translating a lower valve stem assembly in an opposite, second direction to a second, opposite position;
   extending at least one stop from the upper valve stem assembly to provide a positive stop for the upper valve stem assembly against a vent separator defining the vent space; and
   flowing a first cleaning fluid through a side channel that extends through the lower valve stem assembly and into an interior space of the valve body.

22. The method according to claim 21, further comprising the steps of:
   translating the upper valve stem assembly in the second direction to a third position;
   translating the lower valve stem assembly the first direction to a fourth position; and
   flowing a second cleaning solution through a center channel that extends through said lower valve stem assembly and said upper valve stem assembly into said vent space.

23. A valve assembly comprising:
   means for translating an upper valve stem assembly in a first direction to a first position against a sealing surface of a valve body away from a vent space;
   means for translating a lower valve stem assembly in an opposite, second direction to a second, opposite position;
   means for extending at least one stop from the upper valve stem assembly to provide a positive stop for the upper valve stem assembly against a vent separator defining the vent space; and
   means for flowing a first cleaning fluid through a side channel that extends through the lower valve stem assembly and into an interior space of the valve body.

* * * * *